Nov. 1, 1927.
C. C. RICHARDSON
1,647,310
APPARATUS FOR REMOVING SOLID MATTER FROM ROTARY MUD
Filed Sept. 8, 1924
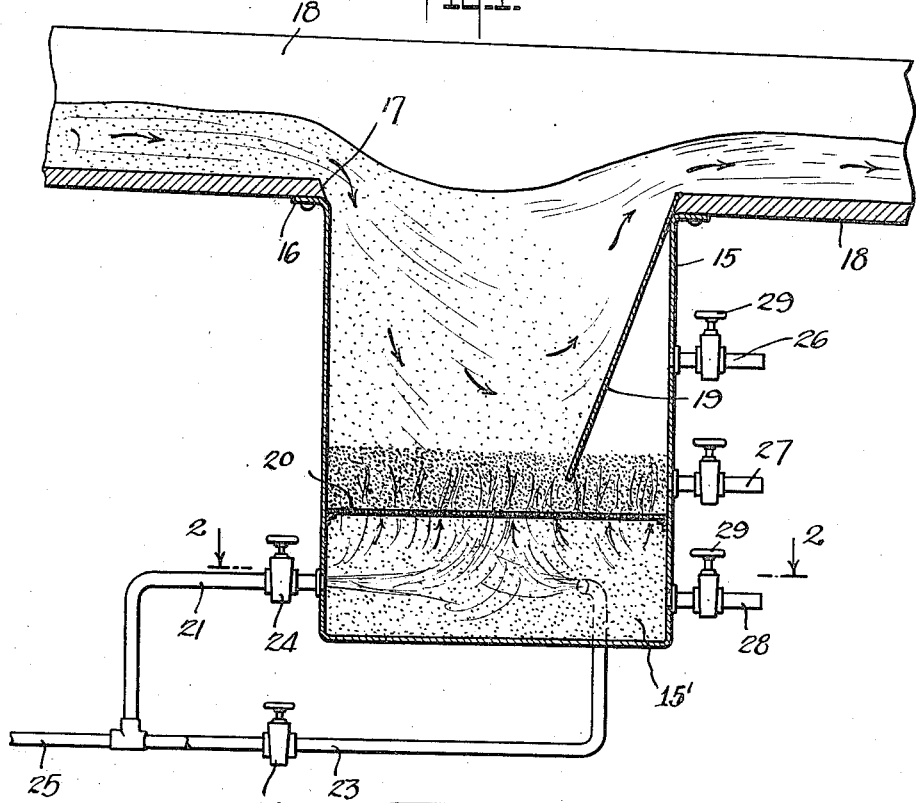
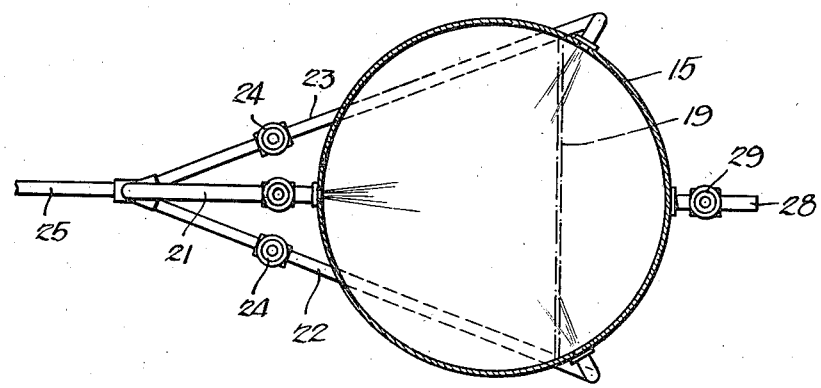
Inventor
CLARENCE C. RICHARDSON
By Munn & Co.
Attorneys Patented Nov. 1, 1927.

1,647,310

UNITED STATES PATENT OFFICE.

CLARENCE CECIL RICHARDSON, OF LONG BEACH, CALIFORNIA.

APPARATUS FOR REMOVING SOLID MATTER FROM ROTARY MUD.

Application filed September 8, 1924. Serial No. 736,661.

My invention relates to and has for its purpose the provision of an apparatus for removing sand, gravel and other solid matter from rotary mud as used in well drilling, whereby the excessive wear to which the drilling and pumping apparatus are usually subjected is reduced to a minimum.

I will describe only one apparatus, embodying my invention, and will then point out the novel features thereof in claim.

In the accompanying drawings

Figure 1 is a view showing in vertical section one form of apparatus embodying my invention in applied position with respect to a mud box;

Figure 2 is a horizontal sectional view taken on the line 2—2 of Figure 1.

Referring specifically to the drawings, in which similar reference characters refer to similar parts, my invention in its present embodiment is shown as comprising a tank or receptacle 15 having its upper edge provided with a flange 16 by which it is adapted to be secured in depending relation to an opening 17 in a conventional form of mud box 18 so that the rotary mud traversing the mud box will be caused to pass into and out of the tank, as illustrated in Figure 1. This action of the rotary mud is facilitated and the possibility of the mud whirling within the tank is prevented by a baffle plate 19 disposed in inclined position within the tank and against which the current of mud entering the tank impinges and is deflected upwardly so as to return to the mud box in passing to the pump.

Within the tank 15 adjacent the bottom and below the baffle plate 19 is a screen 20 which consists of a perforated disk supported in horizontal position as shown and forming a base chamber 15'. Below the screen 20 water pipes 21, 22 and 23 are arranged to discharge water at equally spaced points within the tank, the discharge of water being controlled by valves 24, one for each of the pipes, and water being supplied to the pipes from a supply pipe 25 in communication with a suitable source of water supply (not shown).

A plurality of take-off pipes 26, 27 and 28 communicate with the tank at different levels, and valves 29 are provided in each of the pipes for controlling the discharge of liquid from the tank.

In operation, the tank 15 is partly filled with fresh and clean water by the opening of the valves 24, the level of the water being to a point just above the screen 20. The rotary mud from the well is now permitted to be discharged from the mud box into the tank and simultaneously with this action the valves 24 are opened so as to set up a constant supply of clean water to the tank to substantially maintain the initial level. With the constant supply of rotary mud to the tank a downward pressure upon the body of clean water is exerted by the mud, but its pressure is counteracted by an upward pressure exerted by the constant supply of clean water to the tank. These opposing pressures operate to stratify the solid matter contained in the mud at points between the mud and water, and by means of the take-off pipes this solid matter can be withdrawn from the tank. The stratifying operation is continuous so that the rotary mud, in circulating through the tank as indicated by the arrows, is relieved of the solid matter and delivered to the pump substantially free of sand and gravel, thereby reducing to a minimum excessive wear to which the pumping apparatus is usually subjected.

The screen 20 functions to uniformly distribute the upward pressure exerted by the water so that in practice the stratum of solid matter is of substantially uniform thickness. This facilitates the withdrawal of the solid matter from the tank.

From the foregoing operation it will be manifest that I have provided a method of removing solid matter from rotary mud which consists in circulating the rotary mud into and out of a receptacle, and the subjection of the mud, while in the receptacle, to an opposing fluid pressure whereby the solid matter is caused to stratify and thus separate itself from the rotary mud.

Although I have herein shown and described only one method and one apparatus, each embodying my invention, for removing solid matter from rotary mud, it is to be understood that various changes and modifications may be made herein without departing from the spirit of the invention and the spirit and scope of the appended claim.

What I claim is:

An apparatus for removing solid matter from rotary mud as used in well drilling comprising a trough having a bottom opening between its ends, a relatively deep tank having an open top surrounding the opening and depending from the trough so that mud traversing the latter will be caused to circulate into and out of the tank, a perforated disk supported in horizontal position in the tank and spaced from the bottom of the latter to provide a base chamber below the disk and a stratifying chamber above the disk, a baffle plate in the stratifying chamber inclined downwardly and inwardly from the edge of the trough opening to a point spaced from the bottom of the stratifying chamber so as to deflect mud upwardly and out of the chamber, the side wall of the tank having circumferentially spaced openings communicating with the base chamber, valved pipes communicating with the spaced openings and through which cleaning fluid under pressure is admitted to the base chamber so as to pass upwardly through said disk into the solid matter in the stratifying chamber, a plurality of valved take-off pipes communicating with the stratifying chamber at different levels, and a valved take-off pipe in communication with the base chamber.

CLARENCE CECIL RICHARDSON.